United States Patent
Harao et al.

[15] 3,688,144
[45] Aug. 29, 1972

[54] CATHODE RAY TUBE WITH CONTIGUOUS TRANSPARENT SECTION AND FIBER OPTICS SECTION

[72] Inventors: Norio Harao; Motohiro Yano, both of Yokohama, Japan

[73] Assignee: Tokyo Shibaura Electric Co., Ltd., Horikawa-cho, Kawasaki-shi, Japan

[22] Filed: Oct. 14, 1970

[21] Appl. No.: 80,624

[30] Foreign Application Priority Data
Oct. 15, 1969 Japan..................44/97481
Jan. 17, 1970 Japan..................45/4865

[52] U.S. Cl.............313/92 LF, 178/6 D, 350/96 B
[51] Int. Cl.............................H01j 29/18, H01j 29/30
[58] Field of Search.............313/92 LF, 89; 178/6 D

[56] References Cited

UNITED STATES PATENTS

| | | |
|---|---|---|
| 2,091,152 | 8/1937 | Malpica..............313/92 LF X |
| 2,985,784 | 5/1961 | MacNeille..............313/92 LF |
| 3,242,260 | 3/1966 | Cooper et al.......313/92 PF X |
| 3,368,106 | 2/1968 | Berthold.................313/92 LF |

*Primary Examiner*—Robert Segal
*Attorney*—Flynn & Frishauf

[57] ABSTRACT

A cathode ray tube including an envelope, and a head or face plate provided on the front side thereof which is comprised of an optical fiber plate and two reinforced glass plates, closely attached to the longitudinal sides of the fiber plate, the inner surface of the fiber plate being coated with a fluorescent layer to be linearly scanned by electron beams.

5 Claims, 9 Drawing Figures

CATHODE RAY TUBE WITH CONTIGUOUS TRANSPARENT SECTION AND FIBER OPTICS SECTION

BACKGROUND OF THE INVENTION:

This invention relates to a cathode ray tube device and more particularly to a cathode ray tube whose head or face plate includes an optical fiber plate.

In those of the various cathode ray tubes heretofore proposed which are demanded to have a high degree of resolution, those used, for example, in facsimile applications, the head or face plate generally consists of an optical fiber plate. The head plate of such cathode ray tube is positioned on the front end face of an envelope and has an electron beam-scanned fluorescent layer coated on the inner side. Said optical fiber plate is prepared from a large number of juxtaposed fibers. As is well known, the individual fiber of said plate comprises a core of optical glass of high refractive index clad with low refractive glass, and consequently has to be prepared from special glass, namely, a different kind from that of the envelope. Therefore, fusion of the fiber plate to the envelope often results in the noticeable deformation of the former due to the heat applied. The aforementioned cathode ray tube is generally of the type whose head plate is linearly scanned. In this case the fiber plate is made narrow to agree with the mode of scanning, so that lengthwide and crosswise portions of the plate are thermally expanded in different degrees, leading to its deformation. This deformation renders the fiber plate, and in consequence the cathode ray tube, weak to mechanical shocks. Particularly with a large capacity cathode ray tube whose head plate has to be formed sufficiently thick to withstand atmospheric pressure and other external forces, the occurrence of such strain becomes all the more prominent, rendering the entire tube device far less resistant to mechanical stress such as vibrations.

The object of the present invention is to provide a cathode ray tube device wherein the optical fiber plate is saved from deformation.

SUMMARY OF THE INVENTION

A cathode ray tube device according to the present invention has a head plate disposed at the front of an envelope, said head plate consisting of a narrow fiber plate and two reinforcement glass plates positioned parallel with the lengthwise direction of the fiber plate and fitted to both sides thereof for support. Further, a fluorescent layer formed on the head plate consists of a first section made of fluorescent material having prescribed after-glow time characteristics and a second section similarly prepared from fluorescent material presenting shorter after-glow time characteristics. The first section is positioned at a point corresponding to the fiber plate and the second section at a point corresponding to the reinforcement glass plate, the former being used in reception of images and the latter in transmission thereof.

BRIEF EXPLANATION OF THE DRAWINGS:

The present invention can be more fully understood from the following detailed description when taken in connection with the accompanying drawings, in which.

Figure 1:
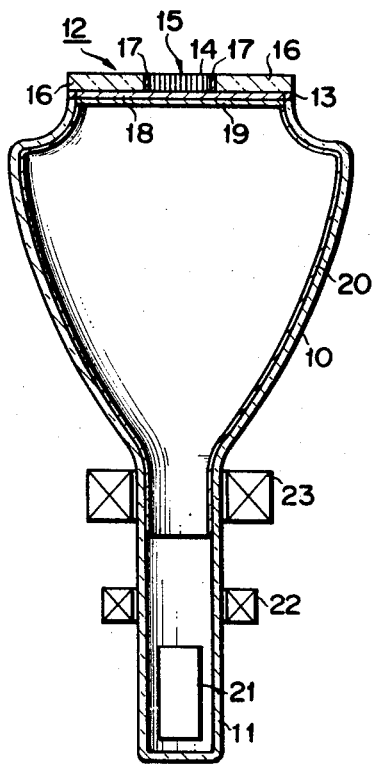
FIG. 1 is a sectional view of a cathode ray tube device according to an embodiment of this invention.
Figure 2A:
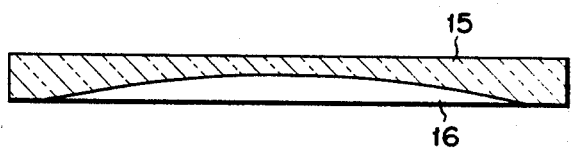
FIGS. 2A and 2B are enlarged sectional and plan views of the device of FIG. 1.
Figure 2B:
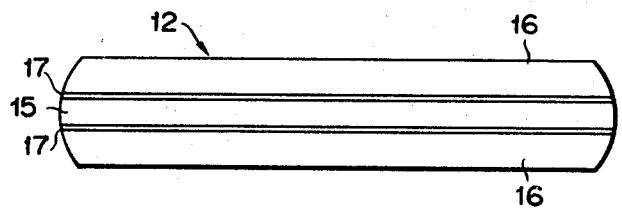

DETAILED DESCRIPTION OF THE INVENTION:

Referring to FIG. 1, an optical fiber recording tube has a flattened cylindrical glass envelope 10 with a narrow opening at the front and neck portion 11 extending outwardly from the rear, said opening being closed by a head or face plate 12. The head or face plate 12 which may be securely bonded to the envelope by means of solder glass 13 comprises, as best shown in FIGS. 2A and 2B, an elongate plate 15 formed of a plurality of short optical fibers 14 bonded in parallel with each other, and two elongate glass plates 16 the lengthwise side of which is closely connected to the corresponding longitudinal side of said fiber plate by means of, for example, solder glass 17. The glass material of the plate 16 preferably may have the same heat expansion coefficient as that of the envelope 10 or a heat expansion coefficient between those of the optical fiber and envelope. It is preferable that said fiber plate has a longitudinally curved inner surface and a flat outer surface. Said head or face plate 12 has on the inner surface a fluorescent layer of film 18 the surface of which is coated with a metal back film 19 of aluminum. The thin film 19 is electrically connected to a conductive film 20 of aluminum or carbon coated on the inside of the envelope 10. The neck portion is provided with an electron gun 21 therein and a focusing magnet 22 and a deflecting yoke 23 on the outside of the neck, so that electron beams emitted from the electron gun 21 are focused by the magnet 22 and deflected by the yoke 23, thereby scanning the fluorescent layer disposed directly under the fiber plate.

In the above-mentioned fiber optical recording tube, the head plate 12 is so constructed that the fiber plate 15 not resistive to mechanical shocks is reinforced by bonding glass plates which are resistive to mechanical shocks to both sides of the fiber plate, and the portion of the fiber plate 15 connected to the envelope where heat strains have occurred with the conventional device is formed of glass material having the same heat expansion coefficient as the glass material constituting the envelope to avoid strains in the head plate. For this reason, the fiber plate and head plate are saved from breakage by vibrations or other mechanical shocks, thereby making it possible to construct relatively large recording tube devices.

Figure 3A:
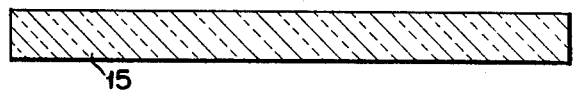
FIGS. 3A and 3B are sectional and plan views of a head or face plate modified from FIG. 1.
Figure 3B:
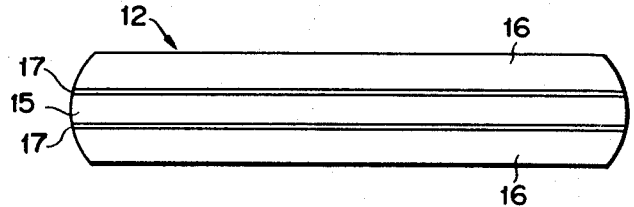
Figure 4:
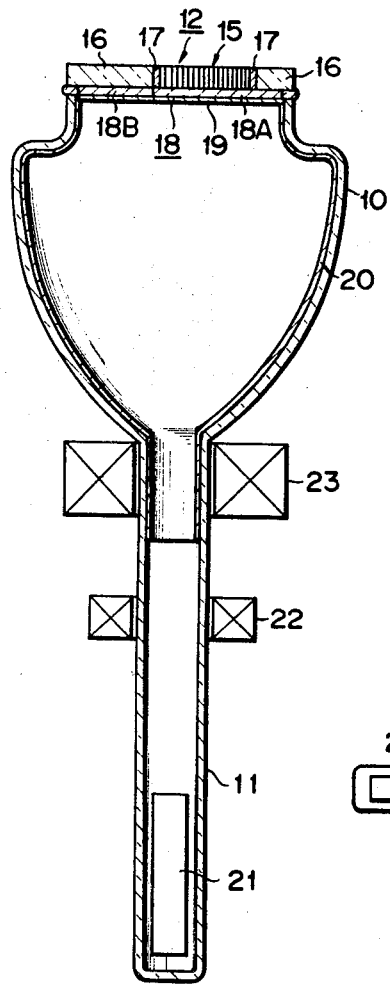
FIG. 4 is a sectional view of a cathode ray tube device according to another embodiment of the invention.

In the above-mentioned embodiment, the inner surface of the fiber plate is shaped in an arcuate form for the purpose of preventing the reduction of resolution and image distortions at the portion receiving electron beams largely deflected or the end portion of the fiber plate. As shown in FIG. 3, however, the inner surface of the fiber plate may be shaped flat, in the case of a smaller recording tube.

There will now be described another embodiment of the invention with reference to FIGS. 4 to 6A and 6B. This embodiment is the same as the preceding one except for the arrangement of the fluorescent layer and the secondary operation, so that description is limited to them.

The fluorescent layer 18 formed on the inner surface of the head plate 12 is separated into two sections 18A and 18B. The first section 18A may be disposed directly under the fiber plate 15 to face or correspond to it, and the second section 18B under the glass plates 16. The first section 18A of the fluorescent layer 18 may be also formed to extend toward the portion under the glass plate and the second section 18B may be disposed on the remaining part of the inner surface of the head plate. The fluorescent material forming the first 18A exhibits a longer residuallight time than that of the second section 18B. The former material may consist of that, for example P11 in RMA (zinc sulfide:silver ; ZnS:Ag) having a 10 percent residual time of about $32\mu s$, which is adapted to pick up images, namely to record images, on a recording sheet such as electron photographing paper and sensitized sheets made of silver chloride. The latter material may consist of, for example, P16 in RMA (calcium magnesium silicate:cerium $Ca_2MgSi_2O_7$:Ce) having a 10 percent residual time of about $0.12\mu s$, P36 in RMA (zinc cadmium sulfide:silver:nickel;(Zn,Cd)S:Ag:Ni) having a 10 percent residual time of about $0.25\mu s$, or P37 in RMA (zinc sulfide:silver: nickel ; ZnS:Ag:Ni) having a 10 percent residual time of about $0.15\mu s$, which is suited to transmit images, namely to read images, by, for example, a flying spot scanner. Thus, the fiber plate 15 picks up images and the glass plate 16 transmits images received. Accordingly the embodiment of FIG. 4 may simultaneously or individually carry out image pickup and transmission as required.

Figure 6A:
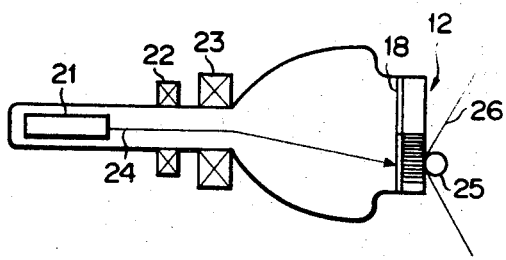
FIGS. 6A and 6B schematically illustrate the operating mode of the device of FIG. 4.
Figure 6B:
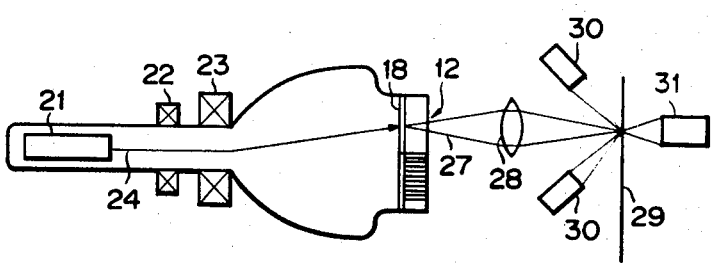
Figure 5:
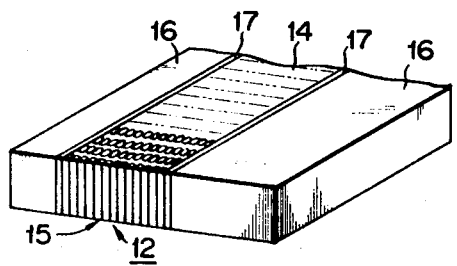
FIG. 5 is an enlarged perspective view, partly broken away, of the head plate of the device of FIG. 4.

Both operations will be more easily understood from the following description by reference to FIGS. 6A and 6B. Referring now to FIG. 6A, the pickup operation is conducted in such a manner that electron beams modified by given image signals are emitted from the electron gun 21, focused by the coil 22 and finally deflected by the yoke 23 to be directed toward the first fluorescent section 18A and scan linearly or in one dimension. The scanning beams excite the fluorescent layer to produce corresponding lights which are conducted to the outside through the fiber plate and finally expose a recording sheet 26 abutting on the fiber plate by means of a back positioned electrode 25. The recording sheet 26 may be of a type generally used in this particular field, to which there are later applied various treatments such as development and fixation to obtain a figure corresponding to signals of electron beams.

In the case of image transmission, the device may be used as shown in FIG. 6B. Electron beams are emitted from the electron gun 21 in the form of stationary current, focused by the coil 22 and oriented and deflected to the second fluorescent section 18B by the yoke 23, thereby scanning the section 18B along the longitudinal direction thereof in one dimension. The lights excited by the electron beams in the fluorescent section 18B are transmitted through the glass plate 16 and focused on a sheet 29 stored with media to be picked up through a lens 28. With an opaque recorded sheet, the light reflected therefrom may be received by photomultipliers 30 mounted on that side of the sheet which face the lens, obtaining electric signals corresponding to the media recorded on the sheet 29 in the photomultipliers 30. With a transparent sheet, a photomultiplier 31 may be disposed on the opposite side to the lens 28.

It is for the following reason that the glass plate 16 of the head or face plate 12, and not the fiber plate 15, was used in image transmission. If the fiber plate is used for the purpose described above, the fluorescent lights excited by electron beams are diffused in the fiber plate when they pass therethrough so that the spot of the light becomes larger than that of the initial beams. Since there is produced on the reading sheet a focused light having a diameter proportionate to that of a light spot appearing on the surface of the fiber plate, the light spot on said sheet grows unduly large or blurred, making it impossible to obtain good resolution. Contrary, the use of the glass plate for reading as in this invention prevents light from being diffused in the head or face plate, so that a light spot corresponding to that of the electron beam spot is obtained on the reading sheet to effect good resolution. With the conventional device using, for example, a glass fiber 25 microns in diameter, an electron beam spot 100 microns in diameter appeared as a light spot having a 20 to 30 percent larger diameter. However, the device of the present invention is free from any such defect.

In the cathode ray tube of the last embodiment, of course, the fiber plate is firmly reinforced, since the glass plates are tightly bonded to both sides of the fiber plate as in the device of the preceding embodiment.

What we claim:

1. A cathode ray tube device comprising:
   an envelope having a neck portion at one end;
   an electron gun disposed in said neck portion;
   a face plate fitted to the other end of said envelope, said face plate including an image receiving optical fiber plate, and image transmission and supporting clear glass plates which are secured to both sides of said fiber plate;
   a fluorescent layer formed on the inner surface of said face plate to be scanned by electron beams emitted from said electron gun, said fluorescent layer including a first section comprised of a first fluorescent material coated on said optical fiber plate, and a second section comprised of a second fluorescent material coated on at least one of said clear glass plates, said first fluorescent material having a longer residual light time than said second fluorescent material; and
   focusing and deflection means provided between said fluorescent layer and said electron gun to focus and deflect said electron beams.

2. The device according to claim 1 wherein the inner surface of said fiber plate is curved along the longitudinal direction thereof.

3. The device according to claim 1 wherein the inner surface of said fiber plate is flat along the longitudinal direction thereof.

4. The device according to claim 1 including a pair of clear glass plates bonded to respective sides of said fiber plate.

5. The device according to claim 1 wherein said first and second fluorescent sections are adjacent to each other.

* * * * *